United States Patent [19]

Zana et al.

[11] Patent Number: 5,311,018
[45] Date of Patent: May 10, 1994

[54] OPTICAL SYSTEM FOR OBTAINING SEPARATE AND SIMULTANEOUS NEAR-INFRARED AND VISIBLE LIGHT IMAGES

[75] Inventors: Lawrence J. Zana, Hampton Township; Gerald A. Breakey, Trafford, both of Pa.

[73] Assignee: The United States of America as represented by the Secretary of the Air Force, Washington, D.C.

[21] Appl. No.: 16,396

[22] Filed: Feb. 11, 1993

[51] Int. Cl.[5] ............................................. G01S 17/02
[52] U.S. Cl. ....................................... 250/330; 250/341
[58] Field of Search .................................. 250/330, 341

[56] References Cited

U.S. PATENT DOCUMENTS

| | | | |
|---|---|---|---|
| 4,576,486 | 3/1986 | Dils | 374/131 |
| 4,751,571 | 6/1988 | Lillquist | 358/113 |
| 4,817,622 | 4/1989 | Pennypacker et al. | 128/664 |
| 4,843,242 | 6/1989 | Doyle | 250/330 |
| 4,959,546 | 9/1990 | Bly | 250/330 |
| 4,967,276 | 10/1990 | Murakami et al. | 358/183 |
| 5,120,966 | 6/1992 | Kondo | 250/372 |

*Primary Examiner*—Constantine Hannaher
*Attorney, Agent, or Firm*—Donald J. Singer; Robert L. Nathans

[57] ABSTRACT

A camera system for simultaneously recording separate near-infrared and visible light images is disclosed having a visible light source for illuminating a given area with visible white light, indicia generating means for directing an image of a wavelength of light longer than wavelengths of light of the visible white light upon the given area, a first electronic camera for recording an image of the visible light but not the longer wavelength of light and a second electronic camera for recording an image of the longer wavelength of light but not the visible light, and a single cold mirror common to the two cameras for directing the two light images to their respective cameras.

18 Claims, 1 Drawing Sheet

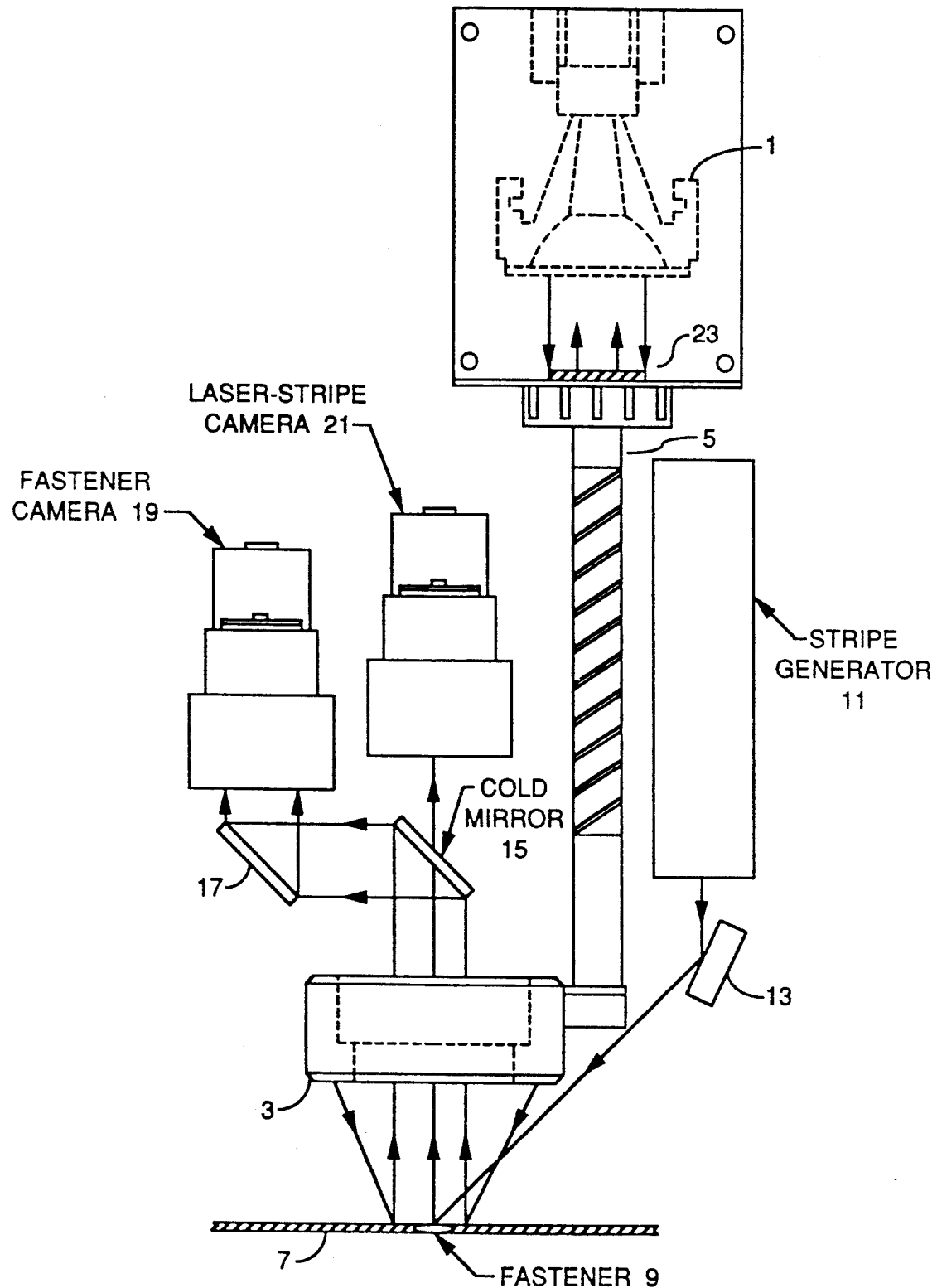

OPTICAL SYSTEM FOR OBTAINING SEPARATE AND SIMULTANEOUS NEAR-INFRARED AND VISIBLE LIGHT IMAGES

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of manipulating light images in the visible and infrared regions.

Frequently, a machine vision system is required to measure the orientation, distance and three-dimensional coordinates of an object in its field of view. An attractive means to accomplish this is by the use of structured illumination, usually in the form of a narrow laser generated stripe or double stripe crosshair. When using this method, the optical path to the camera typically includes some type of narrow bandpass filter that allows the laser light wavelength such as 780 nm for a laser-diode to pass through, while blocking light of other wavelengths. This simplifies the image analysis problem for the light stripe. An example of such a system is a robotic seam tracker.

Conversely, many machine vision applications such as inspection systems, require lighting that contains all visible wavelengths (white light) as an illumination source in order to maximize contrast. These systems typically require the lighting to be over the entire field-of-view, as opposed to the aforesaid narrow stripe.

A problem arises when a machine vision system is required to perform both the 3-D measurement and the inspection functions, or when the centroid of the object is not apparent from the projection of the laser, i.e. when the object is relatively planar. An example of a system with such a requirement is the robotic derivating cell for the U.S. Air Force. This system locates and removes rivets and other fasteners from aircraft components such as airlerons and wingflaps. The first step in the removal process is for the machine vision system to find the 3-D coordinates of the fastener and identify the type of fastener. To calculate the 3-D coordinates, a laser crosshair image is used to first calculate the plane of the component surface in 3-D space in which the component lies. Floodlight illumination is then used to locate the center of the rivet within this plane, and also to identify the rivet type.

It is critical in machine vision applications that the lighting be optimized for each function. Unfortunately, the two functions stated above have conflicting goals with respect to the lighting and optics requirements. The 3-D location function wants to see only the laser crosshair image while the fastener location and fastener identification function requires the entire field of view evenly illuminated.

Prior to the present invention, the aforesaid problem might of been addressed through the use of complicated electro-mechanical shuttering or mirror arrangements. However, the two types of images would still not be simultaneously available. Also these arrangements would increase the cost and complexity of the machines while reducing the ruggedness and reliability of the system. Although compromise lighting systems are an alternative approach, they generally tend to degrade the performance of each function.

BRIEF SUMMARY OF THE INVENTION

A camera system for simultaneously recording separate near-infrared and visible light images preferably comprises a visible light source for illuminating a given area with visible white light, indicia generating means for directing an image of a wavelength of light longer than wavelengths of light of the visible white light upon the given area, the image having an area substantially smaller than said given area, a first optical system for transmitting the visible light but not the longer wavelength of light from the given area to a first camera, a second optical system for transmitting the longer wavelengths of light but not the visible light to a second camera, and means for optically positioning a cold mirror between the given area and both of the first and second cameras, the mirror being configured to reflect the visible light to direct it to the first camera while transmitting the longer wavelengths of light through the cold mirror to the second camera.

BRIEF DESCRIPTION OF THE DRAWING

Other objects, features and advantages of the present invention will become apparent upon study of the following description taken in conjunction with the sole figure, illustrating the first and second camera system for performing the aforesaid functions in connection with an exemplary fastener removal system.

DETAILED DESCRIPTION OF A PREFERRED EMBODIMENT OF THE INVENTION

A quartz-halogen lamp 1 directs light into a light transmissive ring member 3 via fiber-optic bundle 5, which illuminates a given area 7 containing the aforesaid fastener 9. Laser generator 11 produces an illuminated crosshair fiducial indicia in the near infrared region above 700 nm. Such a fiducial image may be formed by a suitable mask(s) within the laser stripe generator. The resulting illuminated crosshair is directed upon the surface of the aircraft component 7 via mirror 13 to perform the aforesaid function. The area occupied by the crosshair image will be substantially smaller than the given area illuminated by the visible light ring 3.

The visible white light is reflected off of area 7, is reflected off of cold mirror 15 and is directed at the first electronic camera 19 via mirror 17. The electronic camera is used to control the fastener removal operations. On the other hand, the laser crosshair image passes through cold mirror 15 rather than being reflected therefrom, and is used by the second electronic camera 21 to perform the 3-D location function mentioned above. The nature of a cold mirror, enabling it to transmit IR and reflect visible light, is known in the art. See for example, page 311 of "Optics", Hecht/Zajak, Addison-Wesley, 1974.

A short-pass filter 23 is provided at the exit aperture of the quartz-halogen lamp 1 for blocking the transmission of near IR radiation above 700 nm. Without this filter a considerable amount of full field illumination would pass through the cold mirror, defeating its purpose.

It should now be appreciated that the invention provides apparatus for simultaneously obtaining images of a laser pattern in the IR, and white light images of a floodlit view of a given area by employing a wavelength responsive optical component such as a cold mirror, in the optical paths of the first and second electronic cameras.

Since variations in the aforesaid apparatus will be apparent to the worker in the art, the scope of the invention is to be limited only by the terms of the following claims and art recognized equivalents thereof.

We claim:

1. A camera system for simultaneously recording separate near-infrared and visible light images comprising:
   (a) visible light source means for illuminating a given area with visible white light;
   (b) indicia generating means for directing a light stripe image of a wavelength of light longer than wavelengths of light of the visible white light upon said given area, the image having an area substantially smaller than said given area;
   (c) first camera means for recording an image of said visible light but not said longer wavelength of light;
   (d) second camera means for recording an image of said longer wavelength of light but not said visible light;
   (e) a first optical system for transmitting said visible light but not said longer wavelength of light from said given area to said first camera means;
   (f) a second optical system for transmitting said longer wavelengths of light but not said visible light to said second camera means; and
   (g) mirror means positioned within said first and second optical system and between said given area and both said first and second camera means, said mirror means being configured to reflect said visible light and transmit said longer wavelengths of light through said mirror means to said second camera means.

2. The camera system of claim 1 wherein said visible light source means comprises a lamp which generates some infra-red radiation, and further including a short-pass filter for blocking transmission of the infra-red radiation to said given area.

3. The camera system of claim 2 wherein said visible light source means includes a quartz-halogen lamp.

4. The camera system of claim 3 wherein said first and second camera means comprise electronic image sensors.

5. The camera system of claim 2 wherein said first and second camera means comprise electronic image sensors.

6. The camera system of claim 1 wherein said first and second camera means comprise electronic image sensors.

7. A camera system for simultaneously recording separate near-infrared and visible light images comprising:
   (a) visible light source means for illuminating a given area with visible white light;
   (b) indicia generating means for directing a light stripe image of a wavelength of light longer than wavelengths of light of the visible white light upon said given area, the image having an area substantially smaller than said given area;
   (c) first camera means for recording an image of said visible light but not said longer wavelength of light;
   (d) second camera means for recording an image of said longer wavelength of light but not said visible light;
   (e) a first optical system for transmitting said visible light but not said longer wavelength of light from said given area to said first camera means;
   (f) a second optical system for transmitting said longer wavelengths of light but not said visible light to said second camera means; and
   (g) means for positioning a wavelength responsive optical component within said first and second optical system and between said given area and both said first and second camera means, said wavelength responsive optical component being configured to reflect said visible light and transmit said longer wavelengths of light through said mirror means to said second camera means.

8. The camera system of claim 7 wherein said visible light source means comprises a lamp which generates some infra-red radiation, and further including a short-pass filter for blocking transmission of the infra-red radiation to said given area.

9. The camera system of claim 8 wherein said visible light source means includes a quartz-halogen lamp.

10. The camera system of claim 9 wherein said first and second camera means comprise electronic image sensors.

11. The camera system of claim 8 wherein said first and second camera means comprise electronic image sensors.

12. The camera system of claim 7 wherein said first and second camera means comprise electronic image sensors.

13. A camera system for simultaneously recording separate near-infrared and visible light images comprising:
   (a) visible light source means for illuminating a given area with visible white light;
   (b) indicia generating means for directing at least one narrow elongated image of a wavelength of light longer than wavelengths of light of the visible white light upon said given area;
   (c) first camera means for recording an image of said visible light but not said longer wavelength of light;
   (d) second camera means for recording an image of said longer wavelength of light but not said visible light;
   (e) a first optical system for transmitting said visible light but not said longer wavelength of light from said given area to said first camera means; and
   (f) a second optical system for transmitting said longer wavelengths of light but not said visible light to said second camera means, simultaneously with transmission of said visible light to said first camera means.

14. The camera system of claim 13 wherein said visible light source means comprises a lamp which generates some infra-red radiation, and further including a short-pass filter for blocking transmission of the infra-red radiation to said given area.

15. The camera system of claim 14 wherein said visible light source means includes a quartz-halogen lamp.

16. The camera system of claim 15 wherein said first and second camera means comprise electronic image sensors.

17. The camera system of claim 14 wherein said first and second camera means comprise electronic image sensors.

18. The camera system of claim 13 wherein said first and second camera means comprise electronic image sensors.

* * * * *